(12) United States Patent
Allaei

(10) Patent No.: US 8,651,798 B2
(45) Date of Patent: *Feb. 18, 2014

(54) KINETIC HYDROPOWER GENERATION SYSTEM AND INTAKE THEREFORE

(75) Inventor: Daryoush Allaei, Minnetonka, MN (US)

(73) Assignee: Sheer Wind, Inc., Chaska, MN (US)

( * ) Notice: Subject to any disclaimer, the term of this patent is extended or adjusted under 35 U.S.C. 154(b) by 1257 days.

This patent is subject to a terminal disclaimer.

(21) Appl. No.: 12/466,840

(22) Filed: May 15, 2009

(65) Prior Publication Data

US 2010/0135766 A1   Jun. 3, 2010

Related U.S. Application Data

(63) Continuation-in-part of application No. 12/369,949, filed on Feb. 12, 2009, now Pat. No. 7,811,048.

(51) Int. Cl.
*F03B 17/06* (2006.01)
*F03B 15/20* (2006.01)
*F03B 13/10* (2006.01)
*F03B 13/12* (2006.01)
*F03B 13/26* (2006.01)
*F03D 7/04* (2006.01)
*F03D 11/04* (2006.01)

(52) U.S. Cl.
USPC ........ 415/1; 415/4.3; 415/4.5; 415/7; 415/13; 415/42; 415/48; 415/49; 415/50; 415/145; 416/85

(58) Field of Classification Search
USPC ............... 415/2.1, 3.1, 4.1–4.5, 144–145, 415/905–908, 1, 7, 13, 26, 28–30, 36, 42, 415/47–50, 10; 416/85
See application file for complete search history.

(56) References Cited

U.S. PATENT DOCUMENTS

| | | | | |
|---|---|---|---|---|
| 25,269 | A * | 8/1859 | Livingston | 415/4.4 |
| 84,237 | A | 11/1868 | Waite | |
| 299,127 | A | 5/1884 | Garrigus | |
| 1,345,022 | A | 6/1920 | Oliver | |
| 1,496,767 | A | 6/1924 | Bonetto | |
| 2,616,506 | A | 11/1952 | Mathias | |
| 4,079,264 | A * | 3/1978 | Cohen | 415/2.1 |
| 4,406,579 | A | 9/1983 | Gilson | |
| 6,409,466 | B1 * | 6/2002 | Lamont | 415/3.1 |
| 6,688,841 | B1 | 2/2004 | Wobben | |

(Continued)

FOREIGN PATENT DOCUMENTS

EP   1 845 257 A2   10/2007
JP   05-141340   6/1993

OTHER PUBLICATIONS www.autobloggreen.com/photos/rormaxx/1263571, "RORMaxx Automotive", Jan. 6, 2009, pp. 2.

*Primary Examiner* — Christopher Verdier
(74) *Attorney, Agent, or Firm* — Leffert Jay & Polglaze, P.A.

(57) ABSTRACT

A kinetic hydropower generation system has a turbine and a generator coupled to the turbine. An underwater intake nozzle assembly is fluidly coupled to the turbine. For one embodiment, an underwater tower nozzle may be fluidly coupled between the turbine and the underwater intake nozzle assembly. The underwater intake nozzle assembly may include a collector and a converging nozzle.

23 Claims, 7 Drawing Sheets

(56) References Cited

U.S. PATENT DOCUMENTS

| | | |
|---|---|---|
| 6,955,049 B2 | 10/2005 | Krouse |
| 6,979,171 B2 | 12/2005 | Lauritsen |
| 6,982,498 B2 * | 1/2006 | Tharp ............................ 415/3.1 |
| 7,811,048 B2 * | 10/2010 | Allaei ............................... 415/1 |
| 2006/0232075 A1 | 10/2006 | Fraenkel |
| 2009/0087301 A1 | 4/2009 | Krouse |

* cited by examiner

US 8,651,798 B2

KINETIC HYDROPOWER GENERATION SYSTEM AND INTAKE THEREFORE

CROSS REFERENCE TO RELATED APPLICATION

This is a continuation in part of U.S. patent application Ser. No. 12/369,949, filed Feb. 12, 2009, titled "TURBINE-INTAKE TOWER FOR WIND ENERGY CONVERSION SYSTEMS," and issued as U.S. Pat. No. 7,811,048 on Oct. 12, 2010, which application is commonly assigned, the entire contents of which are incorporated herein by reference.

FIELD

The present disclosure relates generally to kinetic hydropower generation and, in particular, the present disclosure relates to kinetic hydropower generation systems and intakes therefore.

BACKGROUND

Due to the recent energy problems that have arisen, considerable interest has been given to converting the kinetic energy of fluid flows occurring in nature, e.g., wind flows in wind energy conversion systems and water current flows in kinetic hydropower generation systems, into electrical power. For example, wind energy conversion systems involve directing wind through a turbine. The wind causes the turbine to rotate an electrical generator, causing the electrical generator to produce electrical power.

Kinetic hydropower may be defined as, for example, damless hydropower that is converted from energy found in the flowing water currents of oceans, tides, rivers, lakes, and manmade channels or conduits. For example, kinetic hydropower generation systems typically involve submerging a turbine under water and directing flowing water current through the turbine, causing the turbine to rotate an electrical generator for producing electrical power. However, water currents in some bodies of water are too weak for kinetic hydropower generation systems to be cost effective. For example, some hydropower generation systems require current flow velocities of at least about six feet per second in order to generate enough energy for them to be cost-effective.

The electrical power generated from the turbines typically used in wind energy conversion systems and kinetic hydropower generation systems is proportional to cubic order of the flow velocity, e.g., of the water or air, at the turbine inlet. Furthermore, the longer each turbine blade, the higher the power generation. However, long blades are costly, can be subjected to defects and failure, take up a large amount of space, and generate excessive noise and vibration. The electrical power generated from these turbines is directly proportional to the square of the propeller length. However, longer propellers increase not only the cost of material and installation, but also the cost of maintenance. As such, current wind energy conversion systems and kinetic hydropower generation systems typically suffer from low efficiency, high capital cost, unpredictable failures, excessively high noise and vibration, and/or high maintenance.

For the reasons stated above, and for other reasons stated below which will become apparent to those skilled in the art upon reading and understanding the present specification, there is a need in the art for alternatives to existing wind power generation systems and kinetic hydropower generation systems.

SUMMARY

An embodiment of the present invention provides a kinetic hydropower generation system. The kinetic hydropower generation system has a turbine and a generator coupled to the turbine. An underwater intake nozzle assembly is fluidly coupled to the turbine. For one embodiment, an underwater tower nozzle may be fluidly coupled between the turbine and the underwater intake nozzle assembly. The underwater intake nozzle assembly may include a collector and a converging nozzle.

DETAILED DESCRIPTION

In the following detailed description of the present embodiments, reference is made to the accompanying drawings that form a part hereof, and in which are shown by way of illustration specific embodiments that may be practiced. These embodiments are described in sufficient detail to enable those skilled in the art to practice disclosed subject matter, and it is to be understood that other embodiments may be utilized and that process, electrical or mechanical changes may be made without departing from the scope of the claimed subject matter. The following detailed description is, therefore, not to be taken in a limiting sense, and the scope of the claimed subject matter is defined only by the appended claims and equivalents thereof.

Figure 1:
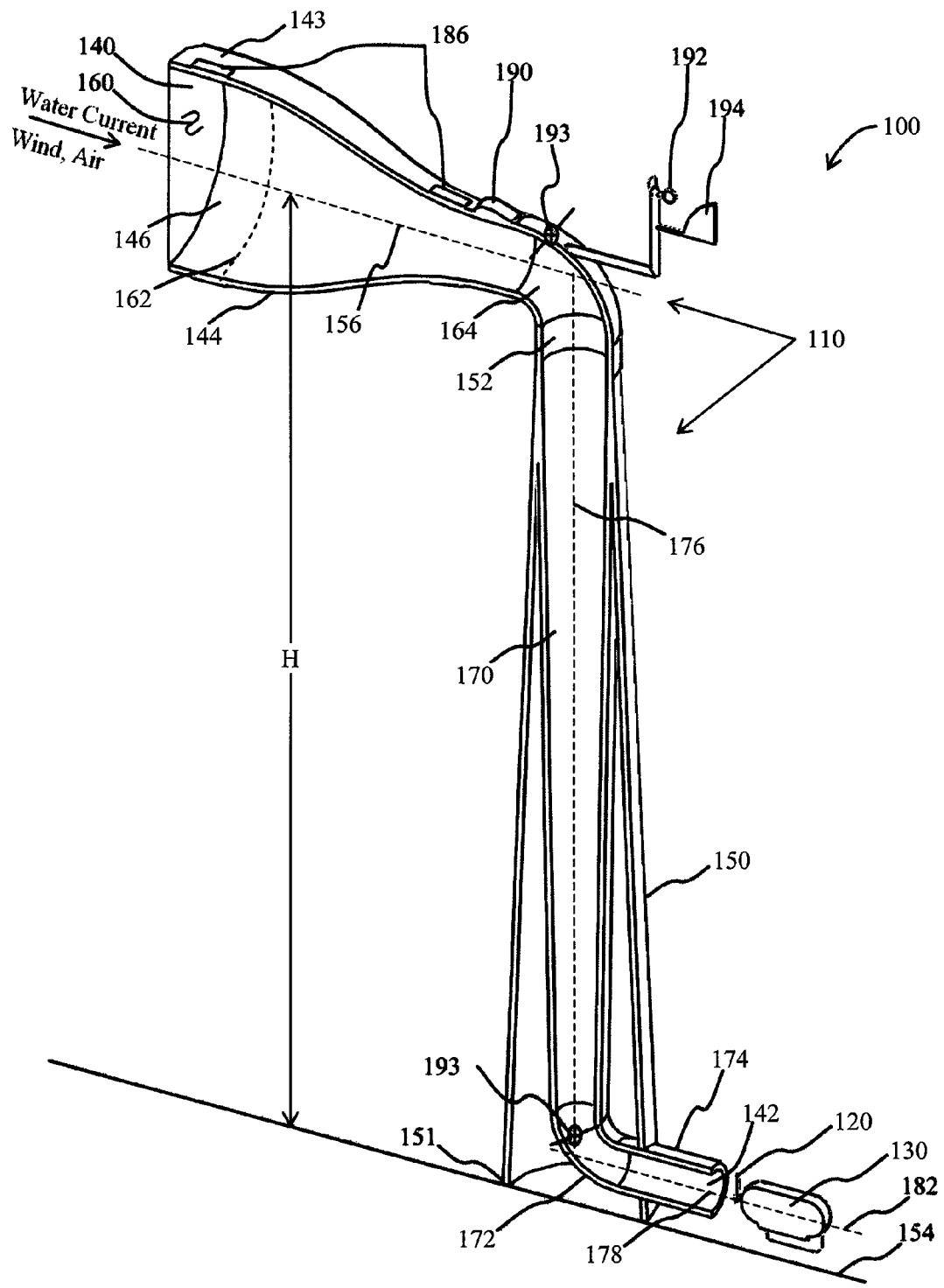
FIG. 1 is a cut-away perspective view of an embodiment of an energy conversion system, according to an embodiment of the present invention.
Figure 3:
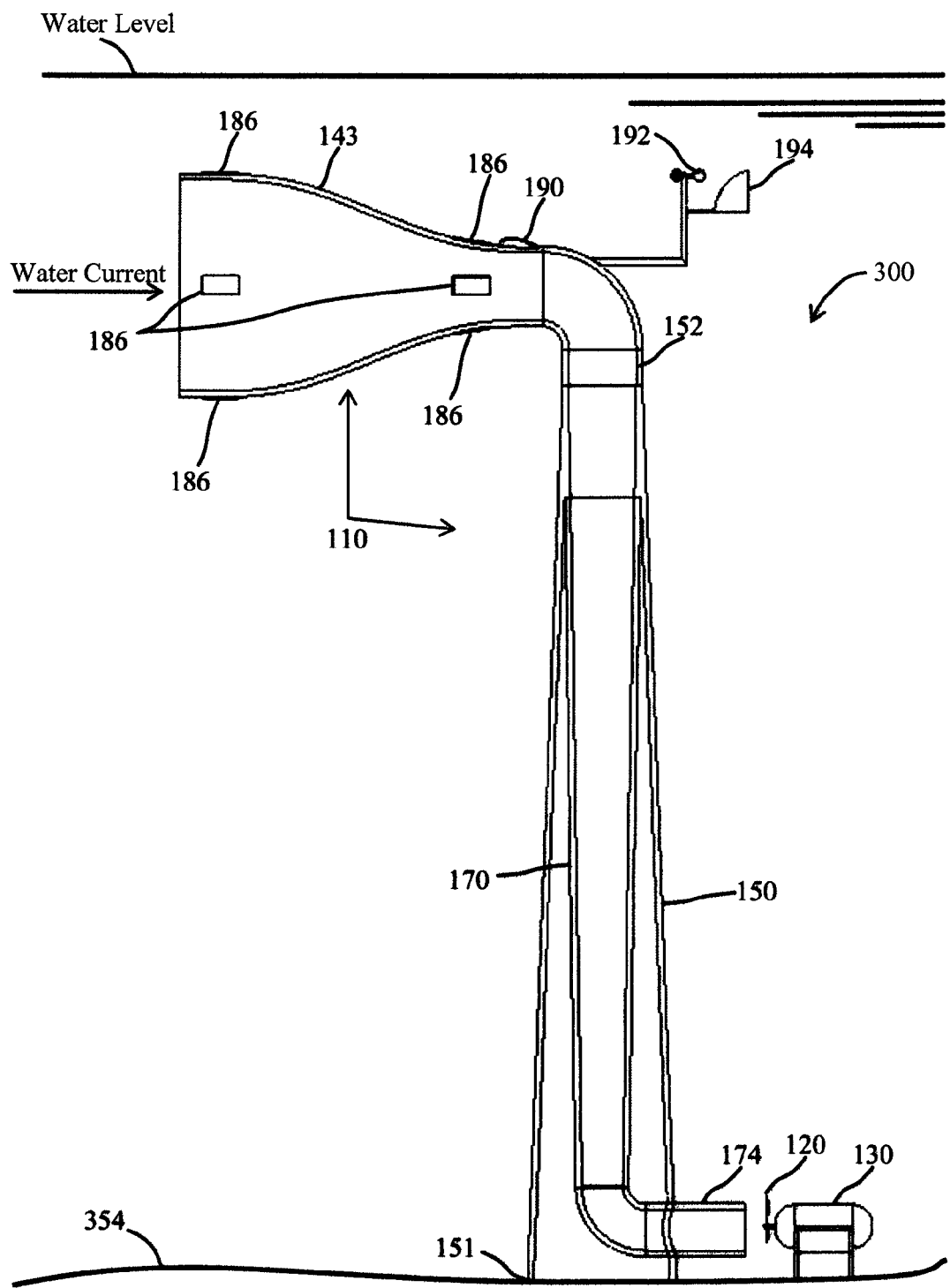
FIG. 3 illustrates an embodiment of a kinetic hydropower generation system submerged in a body of water, according to another embodiment of the present invention.

FIG. 1 is a cut-away perspective view of an energy conversion system 100, such as a wind energy conversion system or a kinetic hydropower generation system. When operating as kinetic hydropower generation system, energy conversion system 100 is submerged within a body of water, such as a river, ocean, lake, or a manmade channel, etc., as is shown in FIG. 3 for a kinetic hydropower generation system 300. Energy conversion system 100 includes a turbine-intake tower 110, a turbine 120 fluidly coupled to turbine-intake tower 110, and an electrical generator 130, such as a 60 Hz AC generator, coupled (e.g., mechanically coupled) to turbine 120.

For underwater applications, electrical generator 130 is suitably waterproofed to protect against electrical shorting and corrosion. To help guard against water corrosion turbine-intake tower 110 and the blades of turbine 120 may be fabricated from a suitable polymer or may be polymer-coated metal. For other embodiments, turbine 120 and electrical generator 130 may be located above water, such as on land or on a platform floating on a body of water, and the water exiting turbine-intake tower 110 may conveyed to turbine 120, e.g., by conduits, such as pipes.

Figure 2:
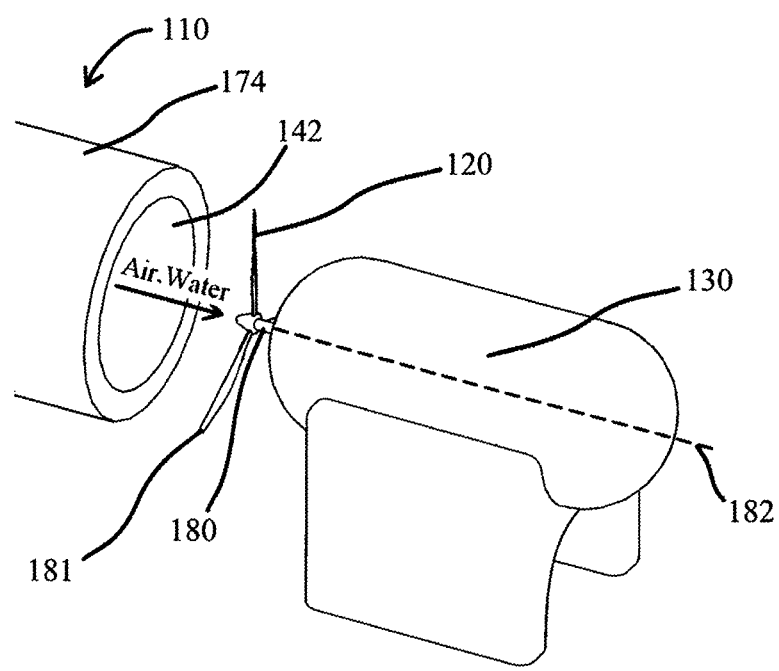
FIG. 2 is an enlarged view of a portion of FIG. 1, according to another embodiment of the present invention.

Turbine-intake tower 110 has an inlet 140 and an outlet 142. Air or water enters turbine-intake tower 110 through inlet 140 flows through turbine-intake tower 110 and exits turbine-intake tower 110 through outlet 142. The air or water exiting though outlet 142 passes over the blades of turbine 120, as shown in FIG. 2, an enlarged view of outlet 142, turbine 120, and generator 130, causing turbine 120 to rotate. Rotation of turbine 120 rotates the generator 130 via a suitable transmission (not shown) that mechanically couples turbine 120 to generator 130.

Inlet 140 may have a screen or other devices to prevent the entry of birds or other airborne objects for wind applications or the entry of fish or other water-born objects for underwater applications. Any conventional bird-catcher or fish-catcher device may be used in this system.

Turbine-intake tower 110 includes an intake nozzle assembly 143 that includes a converging intake nozzle 144 and that may include an integral collector 146 that is contiguous with converging intake nozzle 144. For another embodiment, intake nozzle assembly 143 may be rotatably coupled to a support column 150 of turbine-intake tower 110 by means of a bearing 152. Support column 150 is substantially vertical and acts to support intake nozzle assembly 143 at a vertical height H above ground level 154, where the height H is measured from a central longitudinal axis 156 of intake nozzle assembly 143. Note that ground level 154 may correspond to the floor or the bottom 354 (FIG. 3) of the body of water in which turbine-intake tower 110 is submerged.

For wind applications, the height H may be about the same height as the hub of a turbine of a conventional wind turbine system, where the turbine is mounted atop a tower. For example, the height H may be about 100 to about 200 feet.

For some underwater applications, the height H may be sufficient to position intake nozzle assembly 143 at a distance above the bottom 354 of the body of water where the flow velocity is at or near its highest. For example, for rivers or shallow-water regions near shorelines, the current flow velocity increases toward the surface of the water. For example, in breakwater zones near shorelines, the flow velocity near the surface is higher due to wave action and tidal flow. As such, intake nozzle assembly 143 is positioned to capture tidal flow and wave-induced current.

Support column 150 has a base 151 that may directly contact the ground at ground level 154. Alternatively, for wind applications, intake tower 110 may be positioned on and may be in direct contact with a platform floating on water, for example, for offshore application, in which case ground level 154 would correspond to the surface of the platform. Turbine 120 and generator 130 are located at or near ground level, e.g., at about the same vertical level as base 151 and about the same vertical level as outlet 142, as shown in FIGS. 1 and 2. For example, turbine 120 and generator 130 may be located on the bottom 354 of the body of water, as shown in FIG. 3.

Intake nozzle assembly 143 may be substantially horizontal. That is, central longitudinal axis 156 of intake nozzle assembly 143 may be substantially horizontal. Central longitudinal axis 156 may be substantially parallel to the direction of the wind or water current and thus the direction of the air or water entering intake nozzle assembly 143. The inner surfaces of nozzle assembly 143 are made of a smooth material in order to reduce losses due to surface friction.

Collector 146 extends in the direction of central longitudinal axis 156 from an inlet plane 160 of turbine-intake tower 110 to the dashed line 162, which marks the exit of collector 146. The flow passage within collector 146 is substantially uniform in size between inlet plane 160 and the exit 162 of collector 146, i.e., the cross-sectional area (perpendicular to the flow direction) of the flow passage within collector 146 is substantially uniform between inlet plane 160 and the exit 162. When inlet 140 is facing the wind or the direction of the water current and central longitudinal axis 156 is substantially parallel to the wind or water flow direction, collector 146 collects the wind or water flow.

Intake nozzle 144 is fluidly coupled to collector 146. The flow passage within intake nozzle 144 converges (e.g., tapers) in the direction of central longitudinal axis 156, starting at the exit 162 of collector 146 and ending at an entrance to an elbow 164. That is, the cross-sectional area (perpendicular to the flow direction) of the flow passage within intake nozzle 144 decreases between exit 162 of collector 146 and elbow 164, as shown in FIG. 1. Intake nozzle 144 acts to increase the flow velocity between exit 162 of collector 146 and elbow 164. That is, passing the flow through intake nozzle 144 causes the flow to converge and thus accelerate. Note that intake nozzle 144 receives the wind or water current from collector 146 and accelerates the wind or water current.

Elbow 164 is interposed between intake nozzle assembly 143 and bearing 152. As such, bearing 152 rotatably connects an upper end of support column 150 to elbow 164.

Support column 150 is hollow. A converging tower nozzle 170 (e.g., a column nozzle) is located within an interior of support column 150 and may extend from bearing 152 to an elbow 172 that is coupled to an outlet duct 174 (e.g., sometimes referred to as the turbine inlet duct) that leads to outlet 142. As such, tower nozzle 170 is fluidly coupled to intake nozzle 144 and outlet duct 174.

Tower nozzle 170 may be substantially vertical. For example, a central longitudinal axis 176 of tower nozzle 170 is substantially vertical and is substantially perpendicular to central longitudinal axis 156 of intake nozzle assembly 143, as shown in FIG. 1.

The flow passage within tower nozzle 170 converges (e.g., tapers) in the direction of central longitudinal axis 176, e.g., in the downward vertical direction, starting at the exit of elbow 164 and ending at an entrance to elbow 172. That is, the cross-sectional area (perpendicular to the flow direction) of the flow passage within tower nozzle 170 decreases between elbow 164 and elbow 172, as shown in FIG. 1. Tower nozzle 170 acts to increase the flow velocity between elbow 164 and elbow 172. That is, passing the flow through tower nozzle 170 causes the flow to converge and thus accelerate.

Outlet duct 174 may be substantially horizontal. For example, a central longitudinal axis 178 of outlet duct 174 may be substantially horizontal and may be substantially perpendicular to central longitudinal axis 176 of tower nozzle 170 and substantially parallel to central longitudinal axis 156 of intake nozzle assembly 143, as shown in FIG. 1. Elbow 172 and outlet duct 174 direct the flow from tower nozzle 170 onto the blades of turbine 120. The flow velocity at outlet 142, i.e., the outlet of turbine-intake tower 110 and of duct 174, is the turbine inlet velocity.

Turbine 120 has a rotatable shaft 180 that is substantially horizontal, i.e., shaft 180 has a central longitudinal axis 182 that is substantially horizontal and that is substantially parallel to central longitudinal axis 178 of outlet duct 174. Turbine blades 181 (FIG. 2), e.g., three or more, are mechanically coupled to shaft 180. Note that central longitudinal axis 182 is the rotational axis of turbine 120 about which shaft 180 and the blades rotate.

Turbine 120 may be referred to as a horizontal-axis turbine. Central longitudinal axis 178 of outlet duct 174 central longitudinal axis 182 of shaft 180 may be substantially collinear. Note that for this embodiment, turbine-intake tower 110 has a substantially horizontal outlet. Also note that the direction of the flow exiting outlet duct 174 is substantially parallel to the central longitudinal axis 182 of shaft 180 and thus the rotational axis of turbine 120.

Alternatively, for another embodiment, elbow 172 and outlet duct 174 may be removed, and a turbine 120 may be located at the exit of tower nozzle 170 so that its shaft 180 is substantially vertical. For example, central longitudinal axis 182 of shaft 180 is substantially vertical and is substantially parallel and substantially collinear to central longitudinal axis 176 of tower nozzle 170. In this embodiment, turbine 120 may be referred to as a vertical-axis turbine. Note that the flow velocity at the exit of tower nozzle 170 is the turbine inlet velocity for this embodiment and that turbine 120 receives the fluid flow directly from tower nozzle 170. As such, the exit of tower nozzle 170 is the outlet of turbine-intake tower 110, meaning that turbine-intake tower 110 has a substantially vertical outlet. Again, the direction of the flow exiting tower nozzle 170 is substantially parallel to the vertically oriented central longitudinal axis 182 of shaft 180 and thus the rotational axis of turbine 120.

Elbow 164 has a radius of curvature that acts to keep flow losses relatively low. This means that the flow velocity at the exit of intake nozzle 144 and the entrance to tower nozzle 170 is substantially the same. Elbow 172 also has a radius of curvature that acts to keep flow losses relatively low. In addition, the losses in outlet duct 174 are relatively small. Therefore, the flow velocity at the exit of tower nozzle 170 and the exit of outlet duct 174 are substantially the same. As such, intake nozzle 144 and tower nozzle 170 work together to increase the flow velocity from the velocity at inlet 140 (the wind or water current velocity) to the velocity at outlet 142 (the turbine inlet velocity).

The inner surfaces of the elbows, tower nozzle 170, and outlet duct 174 are made of a smooth material in order to reduce losses due to surface friction. Turbulence suppressors may be implemented to reduce turbulence in elbows 164 and 172, intake nozzle assembly 143, tower nozzle 170, and outlet duct 174 that may result from imperfections and anomalies in elbows 164 and 172, intake nozzle assembly 143, tower nozzle 170, and outlet duct 174.

Note that the flow (wind or water current) velocity at inlet 140 is substantially the same as the flow (wind or water current) velocity at the inlet of a turbine of a conventional wind energy conversion or a conventional kinetic hydropower generation system. This means that the flow velocity at the inlet to turbine 120 is higher than the flow velocity (wind or water current) at the inlet of the turbines of conventional wind energy conversion systems and conventional kinetic hydropower generation systems, owing to increasing the flow velocity using intake nozzle 144 and tower nozzle 170. The increased velocity at the inlet to turbine 120 allows for shorter turbine blades compared to the turbine blades for the turbines of conventional wind energy conversion systems and conventional kinetic hydropower generation systems.

For example, the power output of a turbine is typically proportional to the cubic order of the turbine inlet velocity and is typically proportional to the square of the blade length. Since the turbine inlet velocity, as result of turbine-intake tower 110, of the wind energy conversion systems and the kinetic hydropower generation systems of the present disclosure is higher than the wind or water current velocity at the inlet of a turbine of a conventional wind energy conversion system or a conventional kinetic hydropower generation system, the wind energy conversion systems and the kinetic hydropower generation systems of the present disclosure have a higher power output than conventional wind energy conversion systems and conventional kinetic hydropower generation systems for the same blade length. This means that since the power output of a turbine is proportional to the cubic order of the turbine inlet velocity and is proportional to the square of the blade length, the turbines of the wind energy conversion systems and the kinetic hydropower generation systems of the present disclosure can have shorter blades than the blades of the turbines of conventional wind energy conversion systems and conventional kinetic hydropower generation systems and still have a higher power output.

Shorter blades result in less drag than longer blades and thus result in less energy loss than longer blades. Shorter blades result in lower material costs, installation costs, and maintenance costs compared to the longer blades of the turbines of conventional wind energy conversion systems and conventional kinetic hydropower generation systems. The shorter blades are less susceptible to defects and failure, take up less space, and generate less noise and vibration than the longer blades of the turbines of conventional wind energy conversion systems and conventional kinetic hydropower generation systems.

Figure 4:
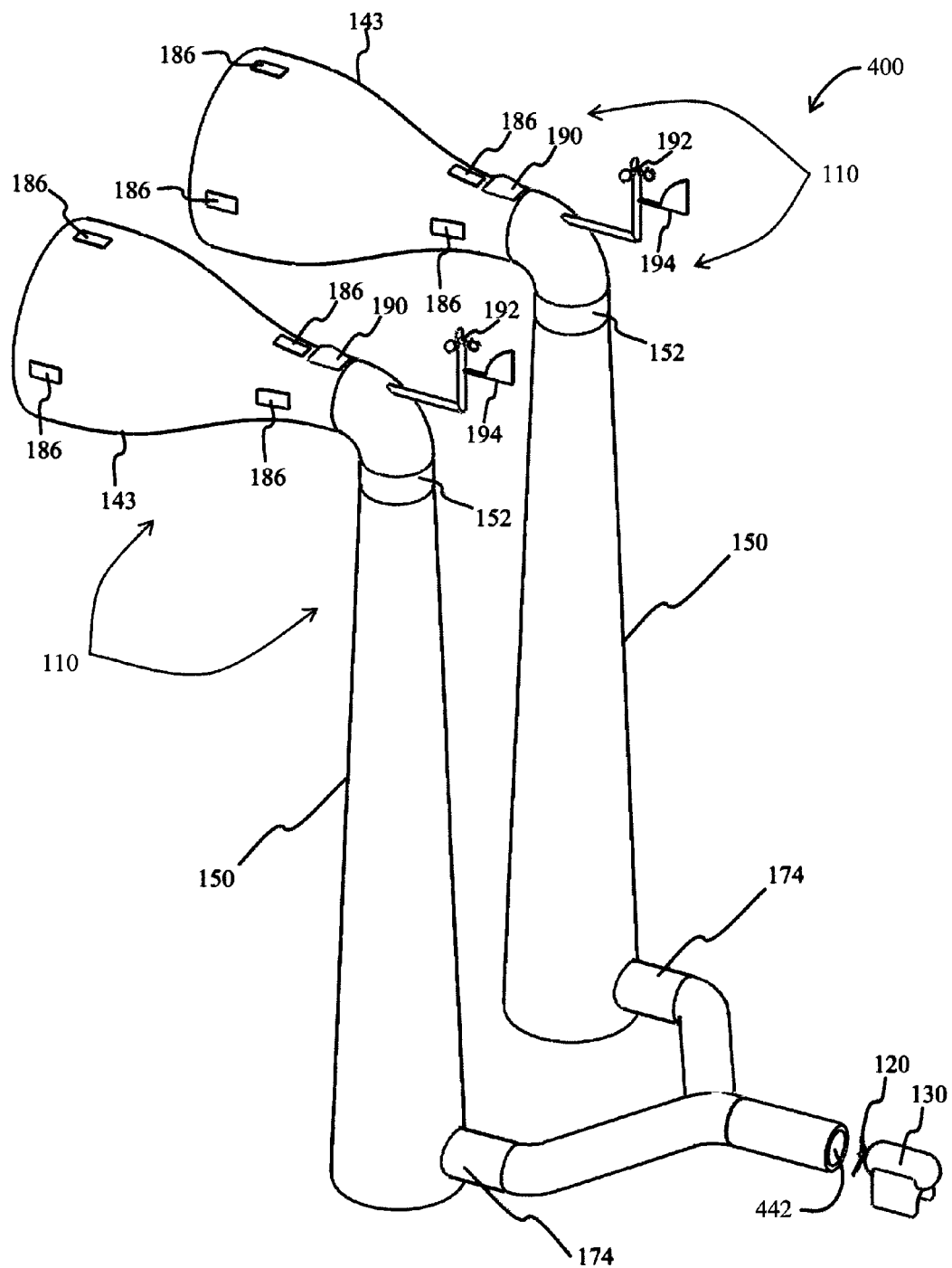
FIG. 4 is a perspective view of another embodiment of an energy conversion system, according to another embodiment of the present invention.

Actuators 186, e.g., piezoelectric actuators, may be physically coupled to the outer surface of intake nozzle assembly 143, e.g., the outer surface of intake nozzle 144 and/or the outer surface of collector 146, as shown in FIGS. 1, 3, and 4. For example, actuators 186 may be coupled in direct physical contact with the outer surface of intake nozzle 144 and/or the outer surface of collector 146. Actuators 186 are electrically coupled to a controller 190 for receiving electrical signals from controller 190.

A flow-velocity sensor 192, may be mounted on an outer surface of turbine-intake tower 110 at or near the top of turbine-intake tower 110 for sensing the velocity of the wind or water current. For example, flow-velocity sensor 192 may be mounted on elbow 164, as shown in FIG. 1, or on intake nozzle assembly 143. Flow-velocity sensor 192 may be electrically coupled to controller 190 for sending electrical signals to controller 190 indicative of the sensed wind or water current flow velocity. Note that although flow-velocity sensor 192 is positioned behind inlet 140, flow-velocity sensor 192 is positioned at a vertical level that is sufficiently above the upper surface of intake nozzle assembly 143 so as to sense the prevailing wind or water current flow velocity external to turbine-intake tower 110. As a result, flow-velocity sensor 192 effectively measures the prevailing wind or water current flow velocity upstream of inlet 140.

A flow-direction sensor 194, may be mounted on an outer surface of turbine-intake tower 110 at or near the top of turbine-intake tower 110 for sensing the direction of the wind or water current flow. Flow-direction sensor 194 catches the wind or water flow such that the water current flow rotates intake nozzle assembly 143 relative to support column 150 such that inlet 140 is directed into the wind or water current flow, e.g., so that central longitudinal axis 156 of intake nozzle assembly 143 is substantially parallel to the wind or water flow direction. Flow-direction sensor 194 may be electrically coupled to controller 190 for sending electrical signals to controller 190 indicative of the sensed wind or water flow direction.

Kinetic hydropower generation systems that are configured to convert the kinetic energy of tidal flows into electrical power are exposed to bidirectional currents. That is, the current flow is in one direction when the tide comes in and in an opposite direction when the tide goes out. Flow-direction sensor 194 catches the incoming or outgoing tide and rotates intake nozzle assembly 143 so that inlet 140 is directed into the incoming or outgoing tide. Note that rivers that flow into the oceans act as tidal channels where the current direction changes with the tide.

For another embodiment, upon receiving electrical signals from flow-direction sensor 194, controller 190 may send electrical signals to a yaw motor (not shown) located adjacent bearing 152. A yaw drive (not shown) may mechanically couple the yaw motor to intake nozzle assembly 143. The signals instruct the yaw motor to activate the yaw drive that in turn rotates intake nozzle assembly 143 relative to support column 150 and tower nozzle 170 such that inlet 140 is directed into the wind or the water current flow.

In response to receiving signals indicative of the wind or water flow velocity from flow-velocity sensor 192, controller 190 may send electrical signals to actuators 186. Actuators 186 may then adjust the shape (e.g., contour) of intake nozzle assembly 143 by exerting forces on the outer surface of intake nozzle assembly 143 based on the wind or water flow velocity. That is, the shape of collector 146 and/or the shape of intake nozzle 144 may be adjusted based on the wind or water flow velocity. For example, actuators 186 may adjust the diameter of collector 146 and/or a diameter of intake nozzle 144.

Controller 190 may store voltage values corresponding to the voltages that need to be applied to an actuator 186 to set a diameter at a certain numerical value. The certain numerical value may correspond to a diameter that provides a certain increase in velocity and/or reduced losses for a certain wind or water flow velocity for a certain power output.

For example, flow-velocity sensor 192 might detect a wind or water flow velocity and send a signal indicative of the wind or water flow velocity to controller 190. Controller 190 may then determine the required velocity at outlet 142 to produce a certain power. Controller 190 may further determine how much voltage needs to be applied to an actuator 186 to adjust the diameter of intake nozzle 144 and/or collector 146 in order to produce the required velocity at outlet 142 for the detected wind or water flow velocity. Similarly, controller 190 may adjust the diameter of collector 146 and/or a diameter of intake nozzle 144 to reduce flow losses based on a detected wind or water flow velocity.

In the event that flow-velocity sensor 192 detects a wind or water flow velocity that is excessive, e.g., above a certain value, and that could cause damage to turbine 120 and/or generator 130, controller 190 might send a signal to solenoid activated bleed-off valves 193 located at the elbows 164 and 172 that causes the bleed-off valves 193 to open. Opening the bleed-off valves 193 causes a portion of the flow to be bled off, reducing the turbine inlet velocity to an acceptable value. For example, a portion of the flow may be bled off between intake nozzle assembly 143 and tower nozzle 170, and a portion of the flow may be bled off between tower nozzle 170 and turbine 120. For one embodiment, the bled-off flows may be directed to another turbine.

After intake nozzle assembly 143 is rotated such that inlet 140 is directed into the wind or water current flow and central longitudinal axis 156 is substantially parallel to the wind or water current flow direction, collector 146 collects the wind or water current flow and directs the wind or water flow to intake nozzle 144. Intake nozzle 144 accelerates the wind or water flow. Elbow 164 receives the accelerated wind or water flow from intake nozzle 143 and directs the wind or water current flow to tower nozzle 170 by turning the wind by substantially 90 degrees. Tower nozzle 170 further accelerates the wind or water flow. For one embodiment, elbow 172 receives the further accelerated wind or water flow from tower nozzle 170 and directs the wind or water flow to outlet duct 174 by turning the wind or water flow by substantially 90 degrees. Outlet duct 174 directs the wind or water flow to turbine 120, e.g., when turbine 120 is a horizontal-axis turbine. For another embodiment, e.g., when turbine 120 is a vertical-axis turbine, turbine 120 may receive the wind or water flow directly from tower nozzle 170 while the wind or water is flowing substantially vertically downward.

For another embodiment, the outputs of two or more turbine-intake towers 110 may be sent to a single turbine 120 coupled to a single generator 130, as shown for an energy conversion system 400, such as a wind energy conversion system or a kinetic hydropower generation system, in FIG. 4. In particular, the outlet ducts 174 are coupled to a single outlet 442 directed at turbine 120. Note that the flow velocity at outlet 442 is the turbine inlet velocity. Common numbering is used in FIGS. 1 and 4 to identify components common to FIGS. 1 and 4.

When energy conversion system 400 acts as a kinetic hydropower generation system, energy conversion system 400 is submerged under water. For another embodiment, only turbine-intake towers 110 are submerged under water; and the single turbine 120 and generator 130 are located on land or on a floating platform; and the water exiting the single outlet 442 is conveyed to the turbine 120, e.g., by conduits, such as pipes.

Figure 5:
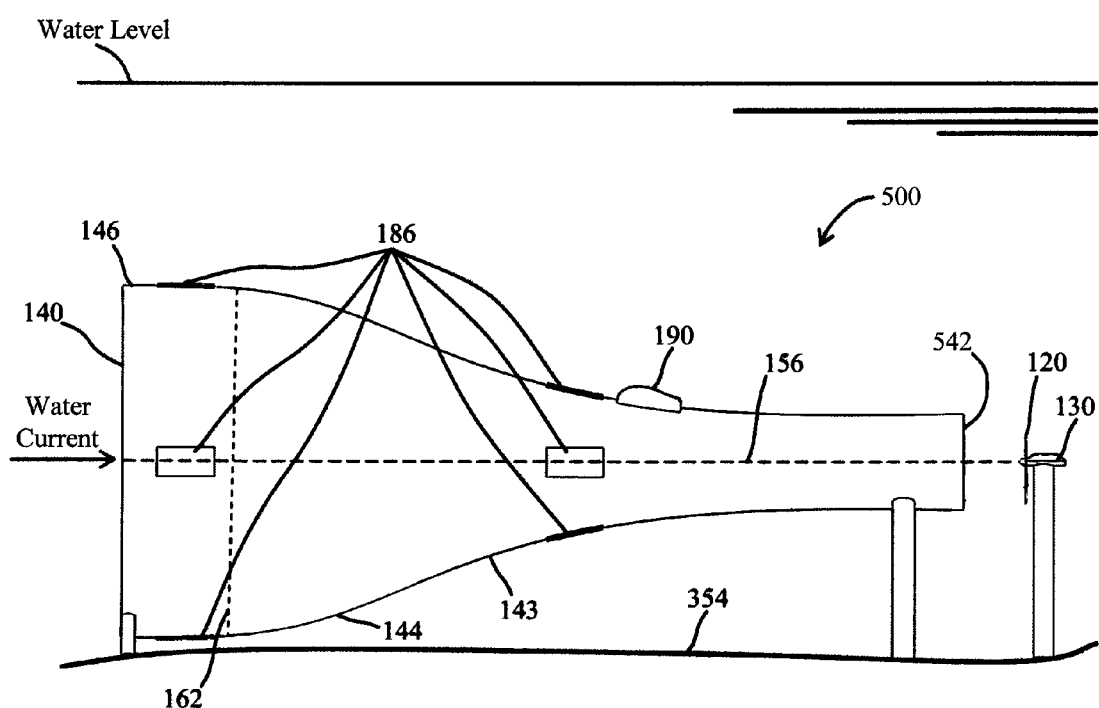
FIG. 5 illustrates another embodiment of a kinetic hydropower generation system submerged in a body of water, according to another embodiment of the present invention.

FIG. 5 illustrates a kinetic hydropower generation system 500 submerged in a body of water, such as a river, ocean, lake, or a manmade channel, etc. Common numbering is used in FIGS. 1-3 and 5 to identify components common to FIGS. 1-3 and 5. Kinetic hydropower generation system 500 includes the nozzle assembly 143, as described above in conjunction with FIG. 1, positioned on bottom 354 of the body of water. Inlet 140 of nozzle assembly 143 is directed into the water current flow.

Intake nozzle assembly 143 may be substantially parallel to bottom 354 of the body of water. That is, central longitudinal axis 156 of intake nozzle assembly 143 may be substantially parallel to bottom 354 of the body of water. Central longitudinal axis 156 may be substantially parallel to the direction of the water current and thus the direction of water entering intake nozzle assembly 143.

Figure 6:
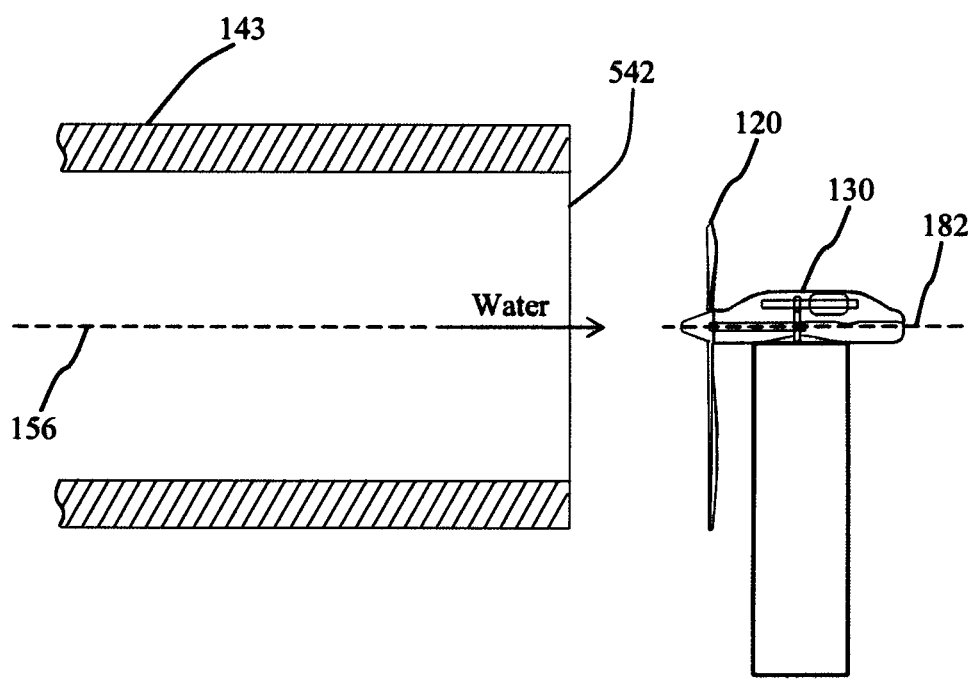
FIG. 6 is an enlarged view of a portion of FIG. 5, according to another embodiment of the present invention.

The central longitudinal axis 182 of turbine shaft 180 (FIG. 2) is substantially parallel to and is substantially collinear with longitudinal axis 156, as shown in FIG. 6, an enlarged view of outlet 542 of intake nozzle assembly 143, turbine 120, and generator 130. As indicated above in conjunction with FIGS. 1 and 2, central longitudinal axis 182 is the rotational axis of turbine 120. Note that the direction of the flow exiting intake nozzle assembly 143 is substantially parallel to the central longitudinal axis 182 of shaft 180.

Nozzle assembly 143 operates as described above in conjunction with FIG. 1. That is, collector 146 collects the water current flow and directs the water flow to intake nozzle 144. Intake nozzle 144 accelerates the water flow and directs the accelerated water flow onto blades of turbine 120, causing turbine 120 to rotate generator 130 so that generator 130 generates electrical power.

Nozzle assembly 143 may include the flow-velocity sensor 192 (FIG. 1) that is electrically coupled to controller 190 for sending electrical signals to controller 190 indicative of the sensed water current flow velocity. Controller 190 may cause actuators 186 to adjust the diameter of collector 146 and/or a diameter of intake nozzle 144 based on the detected water flow velocity, as described above.

For example, controller 190 may determine how much voltage needs to be applied to an actuator 186 to adjust the diameter of intake nozzle 144 and/or collector 146 in order to produce the required velocity at outlet 542 for the detected water flow velocity. Controller 190 may further adjust the diameter of collector 146 and/or a diameter of intake nozzle 144 to reduce flow losses based on a detected water flow velocity.

For another embodiment, the outputs of two or more nozzle assemblies 143 of a kinetic hydropower generation system may be sent to a single turbine 120 coupled to a single generator 130 in a manner similar to that shown in FIG. 4. For example, the outlets 542 of the two or more nozzle assemblies 143 may be coupled to a single outlet, e.g., similar to outlet 442 in FIG. 4, directed at turbine 120.

Figure 7:
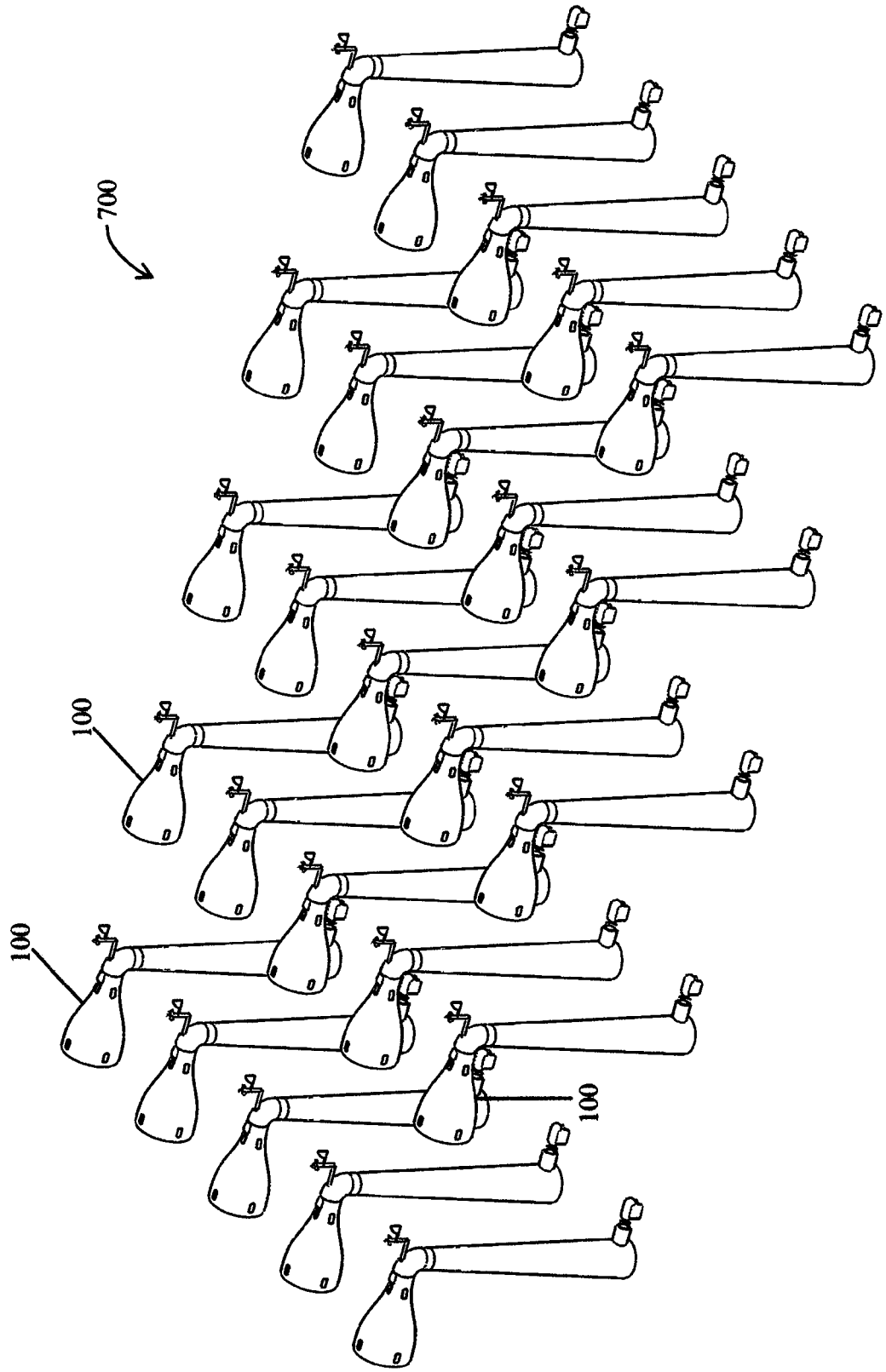
FIG. 7 a perspective view of an embodiment of an array of energy conversion systems, according to another embodiment of the present invention.

FIG. 7 is a perspective view of an array 700 of energy conversion systems 100, as described above in conjunction with FIGS. 1 and 2. Array 700 may be located above ground as a portion of a wind farm or may be submerged in a body of water as a portion of an underwater kinetic-hydropower-generation farm. The turbines and generators of the respective energy conversion systems 100 of the underwater kinetic-hydropower-generation farm may be located underwater or above water, e.g., on land or on a floating platform.

A wind farm may include a plurality of above-ground turbine-intake towers 110 coupled to a single outlet directed at a single turbine, as shown in FIG. 4. An underwater kinetic-hydropower-generation farm may include a plurality of underwater turbine-intake towers 110 coupled to a single outlet directed at a single turbine. The single turbine of the underwater kinetic-hydropower-generation farm may be located on land or on a floating platform, and the water exiting the single outlet may be conveyed to the on-land turbine, e.g., by conduits, such as pipes.

For another embodiment, an underwater kinetic-hydropower-generation farm may include an array of underwater kinetic hydropower generation systems 500 (FIG. 5). The turbines and generators of the respective energy conversion systems 500 may be located underwater or above water, e.g., on land or on a floating platform. Alternatively, an underwater kinetic-hydropower-generation farm may include an array of nozzle assemblies 143, where nozzle assemblies of the array are coupled to a single outlet directed at a single turbine, where the single turbine and the generator coupled thereto are underwater or are above water, e.g., on land or on a floating platform.

Accelerating water current flow using the nozzle assembly 143 of FIG. 5 or accelerating either wind or water current flow using the turbine-intake towers 110 of FIGS. 1, 3, 4, and 7 acts to reduce the length of the turbine blades. Reducing the length of the turbine blades acts to reduce the initial capital cost, installation cost, and the lifetime maintenance cost of the turbine. Accelerating the water current flow using either nozzle assembly 143 or turbine-intake tower 110 acts to increase water current flow velocities that might otherwise be too low to be cost effective to levels that can be cost effective.

Locating the turbine and generator above water as described in some of the embodiments of the disclosed kinetic hydropower generation systems enables easier to access the turbine and generator than the underwater turbines and generators in conventional kinetic hydropower generation systems. This acts to reduce maintenance costs. Above-water turbines and generators are not subjected to the type of water-induced corrosion as is common in under-water turbines and generators. Above-water generators are not subject to the type of water-induced shorting that can occur with underwater generators.

For an embodiment, a method of delivering water current to a turbine, includes accelerating the water current within a first underwater nozzle facing into the water current, further accelerating the water current within a second underwater nozzle that is substantially perpendicular to the first nozzle, adjusting a shape of the first underwater nozzle using one or more actuators coupled in direct physical contact with an outer surface of the first underwater nozzle, wherein adjusting the shape of the first underwater nozzle using the one or more actuators comprises the one or more actuators exerting forces on the outer surface of the first nozzle in response to the one or more actuators receiving electrical signals from a controller electrically coupled to the one or more actuators, and after further accelerating the water current in the second underwater nozzle, directing the water current onto blades of the turbine.

In a further embodiment of the method, the electrical signals received by the one or more actuators from the controller are based on a velocity of the water current external to the first and second underwater nozzles.

The method may further include, before accelerating the water current within the first underwater nozzle, collecting the water current in an underwater collector, and directing the water current to the first underwater nozzle from the collector.

The one or more actuators are one or more first actuators, and the method further includes adjusting a shape of the underwater collector using one or more second actuators coupled in direct physical contact with an outer surface of the underwater collector, wherein adjusting the shape of the underwater collector using the one or more second actuators comprises the one or more second actuators exerting forces on the outer surface of the collector in response to the one or more second actuators receiving electrical signals from the controller.

In a further embodiment, the method further includes, bleeding off a portion of the water current between the first and second underwater nozzles and/or between the second underwater nozzle and the turbine. The method may further include directing the bled-off water current to another turbine.

The method may further include, before accelerating the water current within the first underwater nozzle, catching the water current flow with a flow-direction sensor such that the water current flow rotates the first underwater nozzle relative to the second underwater nozzle so that the first underwater nozzle is directed into the water current.

CONCLUSION

Although specific embodiments have been illustrated and described herein it is manifestly intended that the scope of the claimed subject matter be limited only by the following claims and equivalents thereof.

What is claimed is:

1. A kinetic hydropower generation system, comprising:
a turbine;
a generator coupled to the turbine; and
one or more underwater intake nozzle assemblies, each underwater intake nozzle assembly comprising:
a collector and an integral converging nozzle, the collector configured to collect water current and to deliver the collected water current to the converging nozzle, the converging nozzle configured to accelerate the water current delivered thereto and to deliver the accelerated the water current to the turbine;

a controller;
one or more actuators coupled in direct physical contact with an outer surface of at least one of the collector and the converging nozzle and electrically coupled to the controller;
wherein the one or more actuators are configured to receive electrical signals from the controller and to exert forces on the outer surface of the at least one of the collector and the converging nozzle in response to receiving the electrical signals from the controller; and
wherein the forces exerted on the outer surface of the at least one of the collector and the converging nozzle in response to receiving the electrical signals from the controller change a shape of the at least one of the collector and the converging nozzle;
wherein the turbine is configured to receive the accelerated flow in a direction that is substantially parallel to a rotational axis of the turbine.

2. The kinetic hydropower generation system of claim 1, wherein the turbine and the generator are located under water, on land, or on a platform floating on the water.

3. The kinetic hydropower generation system of claim 1, wherein the forces exerted on the outer surface of the at least one of the collector and the converging nozzle by the one or more actuators are based on a velocity of the water current.

4. The kinetic hydropower generation system of claim 1, further comprising a water-velocity sensor electrically coupled to the controller for sensing and providing a velocity of the water current to the controller.

5. A kinetic hydropower generation system, comprising:
a turbine;
a generator coupled to the turbine; and
one or more underwater turbine-intake towers, each underwater turbine intake tower comprising:
a substantially horizontal intake nozzle assembly located at a vertical level above an outlet of the turbine-intake tower;
a substantially vertical tower nozzle fluidly coupled to the intake nozzle assembly and the turbine and extending substantially vertically between the intake nozzle assembly and the outlet of the turbine-intake tower;
a controller; and
one or more actuators coupled in direct physical contact with an outer surface of the intake nozzle assembly and electrically coupled to the controller, wherein the one or more actuators are configured to receive electrical signals from the controller that cause the one or more actuators to exert forces on the outer surface of the intake nozzle assembly that change a shape of the intake nozzle assembly.

6. The kinetic hydropower generation system of claim 5, further comprising;
a hollow support column;
wherein the intake nozzle assembly is rotatably coupled to the hollow support column; and
wherein the tower nozzle is disposed within the hollow support column.

7. The kinetic hydropower generation system of claim 6, further comprising a flow-direction sensor coupled to the intake nozzle assembly and configured to catch a water current flow such that the water current flow rotates the intake nozzle assembly relative to the support column so that the intake nozzle assembly is directed into the water current flow.

8. The kinetic hydropower generation system of claim 5, wherein the intake nozzle assembly comprises a collector and an integral converging nozzle.

9. The kinetic hydropower generation system of claim 8, wherein the one or more actuators coupled in direct physical contact with the outer surface of the intake nozzle assembly comprise one or more first actuators coupled in direct physical contact with an outer surface of the collector and one or more second actuators coupled in direct physical contact with an outer surface of the integral converging nozzle.

10. The kinetic hydropower generation system of claim 5, wherein the turbine and the generator are located under water, on land, or on a platform floating on the water.

11. The kinetic hydropower generation system of claim 5, wherein the turbine is a vertical-axis turbine and receives a fluid flow directly from the tower nozzle or a horizontal-axis turbine that is configured to receive a substantially horizontal flow from a substantially horizontal outlet duct of the turbine-intake tower that is fluidly coupled to the tower nozzle and the turbine.

12. The kinetic hydropower generation system of claim 5, wherein the kinetic hydropower generation system is part of an underwater kinetic-hydropower-generation farm comprising a plurality of the kinetic hydropower generation systems.

13. The kinetic hydropower generation system of claim 5, wherein the signals from the controller that cause the one or more actuators to exert the forces on the outer surface of the intake nozzle assembly that change a shape of the intake nozzle assembly are based on a velocity of a water current.

14. The kinetic hydropower generation system of claim 5, further comprising a water-velocity sensor electrically coupled to the controller for sensing and providing a velocity of a water current to the controller.

15. The kinetic hydropower generation system of claim 14, wherein the controller is configured to determine a voltage to be applied to an actuator of the one or more actuators to adjust a diameter of the intake nozzle assembly in order to produce a certain water velocity at an outlet of the turbine-intake tower for the velocity of the water current provided to the controller by the water-velocity sensor.

16. The kinetic hydropower generation system of claim 5, wherein the controller is configured to determine a required water velocity at an outlet of the turbine-intake tower to produce a certain power.

17. A method of delivering water current to a turbine, comprising:
accelerating the water current within a first underwater nozzle facing into the water current;
further accelerating the water current within a second underwater nozzle that is substantially perpendicular to the first nozzle;
adjusting a shape of the first underwater nozzle using one or more actuators coupled in direct physical contact with an outer surface of the first underwater nozzle, wherein adjusting the shape of the first underwater nozzle using the one or more actuators comprises the one or more actuators exerting forces on the outer surface of the first nozzle in response to the one or more actuators receiving electrical signals from a controller electrically coupled to the one or more actuators; and
after further accelerating the water current in the second underwater nozzle, directing the water current onto blades of the turbine.

18. The method of claim 17, wherein the electrical signals received by the one or more actuators from the controller are based on a velocity of the water current external to the first and second underwater nozzles.

19. The method of claim 17, further comprising, before accelerating the water current within the first underwater nozzle:
   collecting the water current in an underwater collector; and
   directing the water current to the first underwater nozzle from the collector.

20. The method of claim 19, wherein the one or more actuators are one or more first actuators, and further comprising adjusting a shape of the underwater collector using one or more second actuators coupled in direct physical contact with an outer surface of the underwater collector, wherein adjusting the shape of the underwater collector using the one or more second actuators comprises the one or more second actuators exerting forces on the outer surface of the collector in response to the one or more second actuators receiving electrical signals from the controller.

21. The method of claim 17, further comprising bleeding off a portion of the water current between the first and second underwater nozzles and/or between the second underwater nozzle and the turbine.

22. The method of claim 21, further comprising directing the bled-off water current to another turbine.

23. The method of claim 17, further comprising, before accelerating the water current within the first underwater nozzle, catching the water current flow with a flow-direction sensor such that the water current flow rotates the first underwater nozzle relative to the second underwater nozzle so that the first underwater nozzle is directed into the water current.

\* \* \* \* \*